HIGH RESOLUTION, HEAD POSITIONER SYSTEM

Filed Aug. 13, 1962 2 Sheets-Sheet 1

INVENTOR
JAMES L. GRAY

BY David [signature]

ATTORNEY

Dec. 13, 1966 J. L. GRAY 3,292,168

HIGH RESOLUTION, HEAD POSITIONER SYSTEM

Filed Aug. 13, 1962 2 Sheets-Sheet 2

3,292,168
Patented Dec. 13, 1966

3,292,168

HIGH RESOLUTION, HEAD POSITIONER SYSTEM

James L. Gray, Maple Glen, Pa., assignor to Sperry Rand Corporation, New York, N.Y., a corporation of Delaware Filed Aug. 13, 1962, Ser. No. 216,690
2 Claims. (Cl. 340—174.1)

This invention relates to magnetic storage devices and more particularly to an apparatus for accurately positioning a transducer with respect to a desired magnetic recording track.

With the wide acceptance and use of electronic data processing equipment it has become necessary to find storage devices capable of storing a large amount of data which could be recovered for use within the processing equipment with a high degree of accuracy and speed. Further, the storage medium employed had to provide a relatively permanent, accurate storage of information, which could be handled with a minimum amount of peripheral or additional equipment. The storage equipment to be employed had to provide a maximum amount of storage per unit of storage media itself. One storage media or device which satisfied all these requirements was that of a magnetic drum. This magnetic drum could be fabricated from a base material and coated with a material capable of being magnetized, or it could be constructed of a magnetic material itself capable of being magnetized without the requirement for an additional coating. The magnetic drum is capable of storing a great amount of information and can be moved at relatively high speeds in order to accurately position desired blocks or groupings of information for the processing equipment. The capacity of the drum for storing information can readily be extended by merely increasing its overall length or diameter, thus increasing the circumferential area which could be employed for storage of information. This extension of the physical size of the magnetic drum itself, however, is severely limited by certain physical considerations, namely: As the length of the drum is increased for the diameter increased, the overall weight of the drum system itself is greatly increased. This increase in weight places severe limitations upon the requirements for motor and drive assemblies to move the magnetic drum at the desired rates of speed. Further, the time of access, that is the time required to obtain a particular portion of the information stored on the surface of the drum, is greatly increased as the diameter, and thus the perimeter of the magnetic drum is increased. Thus, in order to obtain efficient use of the surface of the drum and to limit the problems of excess drum weight and long access time to the information stored thereon, it became necessary to place the tracks of information which were recorded in paths about the periphery of the drum and perpendicular to its central longitudinal axis, closer and closer to one another to enable the surface to carry a greater density of recorded information. This increase in the number of tracks of information introduced certain attendant problems such as accurately placing the read-write transducing means with respect to the desired track to be read out or written into. A widely used solution to this problem required the use of individual read-write transducing heads located in a path along the longitudinal axis of the drum and required a single transducing device for each individual track that was employed. In addition to the actual transducing means itself this would require great numbers of read and write amplifiers as well as involved matrices for the selection of a particular head or transducing device which was to be employed for a particular read or write operation. Such a manner of operation of the transducing devices was wasteful of the equipment available. A far simpler solution was presented in that the use of a single head or transducing device which could be moved along a path parallel to the longitudinal axis and be employed to read any desired track in accordance with the location of the data desired. In this manner the matrices required for selection of the individual heads was eliminated, as was the majority of all of the read-write amplifying devices. However, the problem of accurately positioning this individual "flying head" with respect to a track was also greatly increased as the density of channels, that is, the number of tracks recorded along the length of the drum, was increased.

The usual manner of placement of such a "flying head" required a helical screw or an endless belt connected to said transducing device. The screw or the belt would be moved to the desired position in accordance with a signal designating the track to be read out or written into, which in turn would position the transducing device with respect to that particular track. However, due to the increase in the number of tracks employed the requirements for more and more accurate servo systems and gear trains and accurate adjustment of the system became very difficult to fulfill.

Another storage media which satisfied the above storage requirements was magnetic tape. This tape, fabricated out of a non-magnetic base material and coated with a magnetic film or fabricated entirely out of a material which itself could be magnetized has been widely accepted by the data processing field. The amount of storage surface which the tape presented, usually in the form of parallel tracks along the width of the tape, could also be increased by increasing the physical length or width of the tape. However, like the drum, the increase in length added greatly to the problems or accurate tape movement and access time. The increases in width also added to the weight and thus tape movement problems. Thus, limiting tape width and length to usable dimensions, the only manner of increasing the storage ability was to increase the number of tracks across the width of the tape. This produced similar problems, as did the drum, whether using the multiple fixed head arrangement or single "flying head." In addition, the tape utilization introduced problems native only to tape, i.e. stretching the tape due to movement and stopping tension, including equal and unequal stretch across the tape width and positioning errors (failure to place tape directly under heads). These further served as error sources in systems which employed fixed or moving heads for tape utilization.

One solution to this particular problem was the use of guard or guide track placed to either side of the particular track in which the information was stored. By providing proper transducing means and additional circuitry it could be accurately determined whether or not the transducing device had been properly placed with respect to the desired track and in the event it had not, to provide the necessary correction signals to return the transducing device to the desired track. The most obvious shortcoming of a system of this sort was that it required additional track width and thus in effect wasted a portion of the drum surface which it was desired initially to preserve.

However, the particular problems set forth above with regard to the difficulty of accurately placing a transducing device with respect to a desired track or track group are overcome by the employment of a device constructed in accordance with the invention herein. As briefly stated, the invention consists of employing a transducing unit composed of three transducing heads, that is, a head to read out the information stored within information track or tracks and two additional heads which are employed to supervise the accurate placement of said transducing head with respect to the desired track or tracks. A data signal is received in the first of said additional heads indicative of its position to the left of the information track being read. A second transducing device, placed to the right of the information track, receives a signal indicative of its position to the right of the information track. When the read head is properly positioned with respect to the information track, the signals provided by the two additional heads and their related circuitry will be equal in magnitude and opposite in polarity providing an algebraically zero error signal, indicating that the central transducer has been properly placed with respect to the information track. However, in the event that the transducing head has not been placed accurately, one or the other of the additional transducing devices will supply a signal which is greater in magnitude than the other, thus indicating that the head is no longer properly aligned and further indicating the direction and amount of the deviation of the central head with respect to such an information or data track. By the use of certain additional sensitive circuitry, this signal indicative of the deviation from the central track can then be employed to create necessary restoration signals to return the transducer to its desired position.

Other embodiments permit the correct placement of a plurality of information reading heads associated with a plurality of information tracks and employing a single pair of positioning heads. This may be done merely by placing the positioning heads adjacent the left and right sides of a single track used as the guide or homing track, thus bringing into position the reading heads which are mounted on a common mounting assembly with the positioning heads. In this manner a number of tracks may be placed in a position to be read out or written into simultaneously (as in parallel storage of information). However, in this arrangement as in the first, the guide track also serves to store information and is not wasted.

It is therefore an object of this invention to provide a novel form of transducer positioning device employing auxiliary transducing devices placed on either side of the main transducing device to determine its correct position with respect to a desired information track.

It is yet another object of this invention to provide a device for accurately positioning a transducing head with respect to a data channel which can accurately determine the direction in which a shift must be made in order to bring about the desired alignment.

It is a further object of this invention to provide a device for accurately positioning a transducing head with respect to a data track comprising additional transducing means to determine the position of the transducing device for reading the information from the desired track.

It is still another object of this invention to provide a device for accurately positioning a transducing head with respect to a data track without requiring additional record surface for such a positioning device.

Other objects and features of the invention will be pointed out in the following description and claims and illustrated in the accompanying drawings, which disclose, by way of example, the principle of the invention, and the best mode which has been contemplated for carrying it out.

In the drawings.

Similar elements are given similar reference characters in each of the figures.

Figure 1:
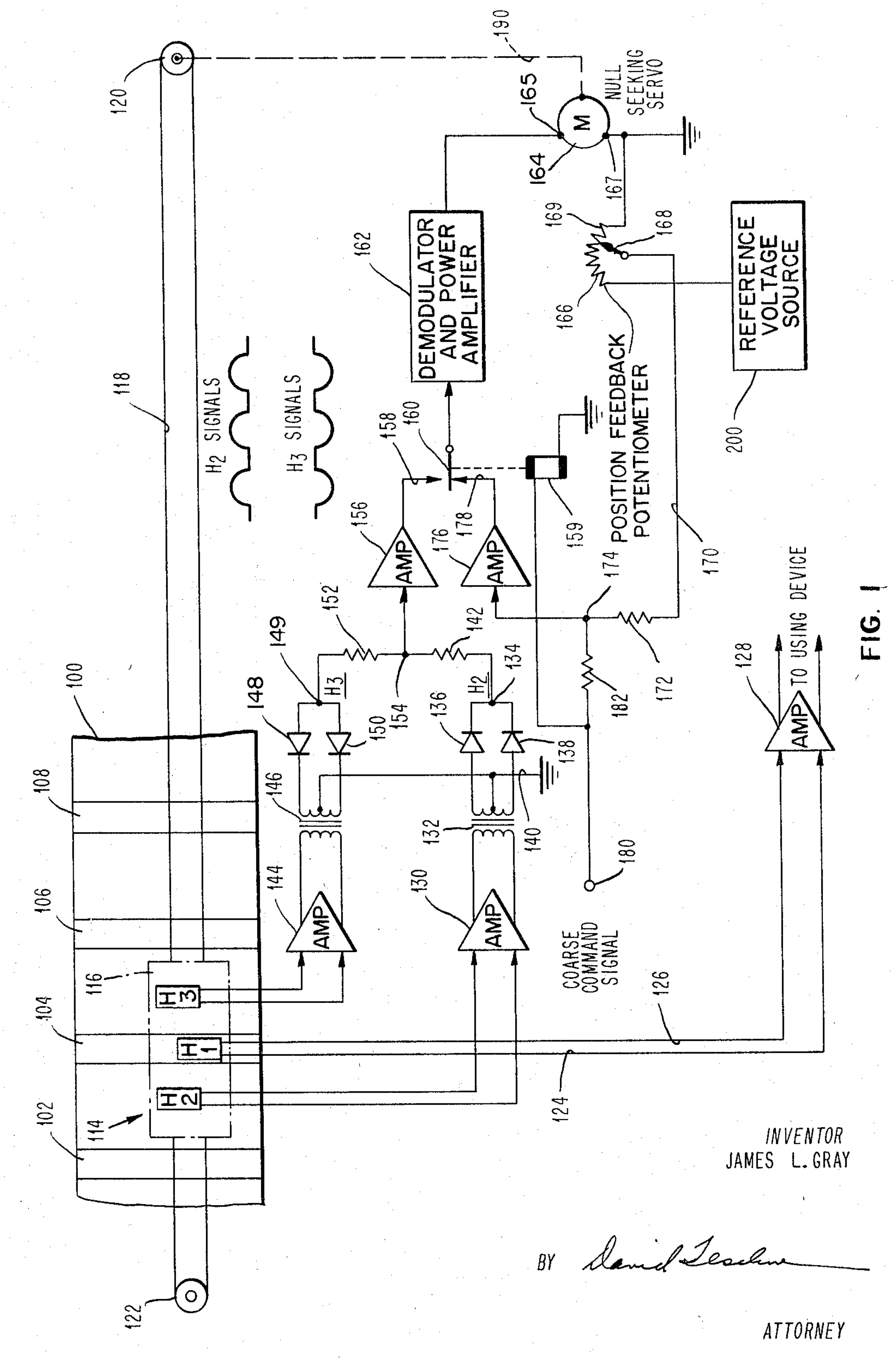
FIGURE 1 illustrates a device constructed in accordance with the basic concept of the invention.

Referring to FIGURE 1 there is shown a portion of a magnetic surface 100 upon which are placed data tracks 102, 104, 106 and 108 which occupy positions perpendicular to the longitudinal axis of the surface 100. The surface is moved by means (not shown). A transducing unit generally indicated as 114, is composed of three individual transducing heads designated H1, H2 and H3. The three transducing devices are so arranged that when they are properly positioned, the transducing device H1 will be centrally located with respect to a desired data channel, for example, 104 as shown. The placement of the assembly operates on the basis that individual positive and negative signals may be obtained from the data signal, which can be employed to control the placement. Thus if a transducer is placed with respect to one side of the data track, a mixed frequency A.C. signal will be read, the amplitude of which will depend upon the position of the transducer with respect to the data track. From this mixed frequency A.C. signal, there can be derived a signal of a desired first polarity. The amplitude of this signal will reflect the extent of movement of this transducer, in a direction right or left, of the data track. A further transducer placed to the other side of the data track can by similar circuitry produce a signal of opposite polarity and of an amplitude reflecting its relative position. Thus if correct positioning of the two transducers is achieved the signals derived from the output circuitry of the two transducers, placed to either side of the data track, will be equal in amplitude but opposite in polarity. The transducing device H2 will be located to the immediate left of the data channel, whereas transducing device H3 will be located to the immediate right of the data channel.

The heads H1, H2 and H3 are affixed to a support member 116 or they may be built into one integral unit so that the three heads are positioned at the same time and the relative location with respect to one another is fixed. The head assembly 114 is arranged for movement by means of an endless belt 118 connected to one portion of said head assembly and looped about a set of rollers 120 and 122. The roller 122 is arranged to be driven by a motor in a manner that will be described below. It should be understood that the drive system shown in the drawing is for illustrative purposes only and the invention is not limited by any specific form of drive system. In addition to the rotary motor unit shown, it may also be a linear drive or any type of device which is capable of responding to polarized signals and which can be controlled as to degree of movement by the amplitude of its input signal. The output signal read by the transducing head H1 is fed over lines 124 and 126 to a read-out amplifier 128 and thence to the utilizing device (not shown). The signal read by the transducing device H2 is read out to a read-out amplifier 130 and directed to the input winding of a transformer 132. The secondary winding of the transformer 132 is arranged to provide a rectified signal at its output connection terminal 134. The rectification is effected by means of a pair of diode devices 136 and 138. The plates of the diodes 136 and 138 are connected directly to the respective ends of the secondary winding whereas the cathodes of such diodes are connected to the output terminal 134. In addition, the center tap position of the secondary winding of the transformer 132 is connected to ground by means of a line 140. The output signal developed at the terminal 134 is impressed across an output resistor 142.

In a similar manner the head H3 is connected through an amplifier 144 to the primary or input windings of a transformer 146. The secondary windings of this transformer are connected to a pair of diodes 148 and 150, commoned at their anodes, to provide a rectified output to the associated output resistor 152.

The center tap of the secondary winding of transformer 146 is also connected to ground by means of line 140.

Resistors 152 and 142 are connected at a common terminal point 154 which is also connected to the input of an amplifier 156. The output of amplifier 156 is made available at a terminal point 158 of a movable relay contact 160. When the contact 160 is in the position opposite to that shown, that is contact member 160 contacts the terminal 158, the signal from the amplifier 156 will be introduced to the demodulator and power amplifier 162. The demodulator and power amplifier 162 serves to separate the signal of the desired frequency used to carry the positioning information from the mixed frequency fed to it and to produce an output of sufficient strength to be usable by the following circuitry. The output of the element 162 will be introduced to winding 165 of the null seeking servo 164. The other winding 167 of the null seeking servo 164, is connected to ground. The shaft of the servo is gauged to the wiper 168 of a position feedback potentiometer and further via the linkage 190 to roller 120. In this manner, as the shaft of the servo is rotated during the nulling procedure the wiper 168 as well as the roller 120 will take up positions corresponding to the movement of the servo shaft. The input side of the potentiometer, that is the winding 169, has applied to it a voltage from a reference source of voltage 200. In this manner the signal read from the wiper 168 over the line 170 will be some function of the servo shaft position and the reference voltage, sufficient to provide required positional correction. The particular signal read by the wiper 168 is returned over a feedback path 170 to a voltage divider resistor 172 and then to one position of the input terminal 174. The signal at the terminal 174 is introduced to the amplifier 176 in a manner that will be set forth below. The output of the amplifier 176 is made available to a terminal position 178. A further signal designated as the coarse command signal is introduced from a source (not shown) to a terminal designated 180. This signal is then introduced to the second resistor 182 of the voltage divider composed of the resistors 182 and 172, the output of this divider being available at the terminal 174.

The manner of operation of the circuit just described will now be set forth. To commence the placement of the transducing unit or apparatus, a coarse command signal will be introduced at the terminal 180 which will produce a voltage across the resistor 182. Further, a signal will be provided across the resistor 172 from the wiper 168 of the position feedback potentiometer 166 in accordance with the particular position in which the servo is now located. The voltages available across the resistors 182 and 172 will provide a voltage at 174 indicative of the relative error between the position which is desired, that is the signal introduced at the terminal 180, and the signal indicative of the actual position, that is the signal induced through the resistor 172. The signal produced at the terminal 174 will be amplified by the amplifier 176 and presented to the terminal 178. The switch 160 occupying its initial position, that is the position shown in the figure, will cause the signal at the terminal 178 to be conducted to the demodulator and power amplifier 162. The demodulator 162 is employed to produce a single frequency A.C. signal to the null seeking servo 164. This demodulation effect is necessary due to the fact that the signal available to its input from the switch 160 may be of a mixed frequency and the signal required for use with a standard A.C. null seeking servo would have to be of a single frequency, or D.C., if a D.C. type of servo is employed. This demodulator may be for example a heterodyne receiver. The signal thus demodulated is amplified to provide a proper level to operate the null seeking servo 164. The null seeking servo would continue to rotate until a point of zero or a null condition between the coarse command signal at the terminal 180 and the signal read at the wiper of the position feedback potentiometer was achieved. As a result of the rotation of the null seeking servo potentiometer wiper is positioned as is the shaft designated 190. This shaft is employed to drive roller 120, upon which the belt 118 is located, thus permitting the movement of the head assembly 114 along the length of the drum. At the end of a time interval sufficient to allow positioning of the head assembly 114 in response to the coarse command signal, the coarse command signal starts to fall off to its zero value. As the signal passes through a low, preselected value, near zero, the current in the control winding of the relay 159 (which controls contact 160) declines to the point where it can no longer maintain contact 160 in contact with terminal 178 and returns to its normally open position, that is with contact 160 engaged with terminal 158. This in effect removes the coarse adjustment or the coarse command signal circuit from control of the null seeking servo. As a result of the command signal the head assembly 114 may be properly placed with respect to the desired channel or may be in a position slightly off of that desired. The placement of the head is within the accuracy which the coarse circuit can achieve. The fine adjustment system using the heads H2 and H3 now trims up or accurately adjusts the position achieved by the coarse circuit so as to produce accurate placement of the head H1 with respect to the desired channel. In the event that the head H1 has been properly placed with respect to the desired channel a positive signal provided by the circuitry of head H2 and a negative signal provided by the circuitry of head H3 will be of equal amplitude and of opposite polarity. The signals thus developed at the output resistors 142 and 152 will be of such equal and opposite magnitude as to provide a zero error signal at the terminal 154. This zero error signal introduced to the amplifier 156 and transferred to the terminal 158 will have no effect upon the position which the null seeking servo 164 now occupies. The signals generated when the head H1 is properly placed, at the terminals 148 and 134 are shown in the figure.

In the event, however, that the head H1 had not been properly positioned with respect to the desired track or channel 104, the signal voltage available at the terminal 154 will not be zero. It should be recalled that the signal at terminal 154 represents the signals from both of the heads H2 and H3. For example, if the entire head assembly 116 should have been placed in such a manner that it is to the left of the desired channel 104 the signal read by the head H2 would be diminished and thus result in a positive voltage across the resistor 142 which is of a relatively low magnitude. On the other hand, the head H3 now placed closer to the track 104 would result in a large amplitude signal being developed at the terminal 148 and a large negative voltage being introduced across the resistor 152. The algebraic summation of these oppositely poled voltages would result in a difference voltage which was negative in polarity being applied to the input of the amplifier 156. The output of the amplifier 156 would be a large amplitude negative voltage which would be introduced to the input of the power amplifier and thence to the null seeking servo 164. The phasing of the motor or servo 164 is so arranged that a negative signal will cause the motor to move in such a direction that the head H3 would be returned to the right, that is away from the strong effect of the data channel 104. This movement would continue until after the signal introduced to the amplifier 156 was again returned to a zero error signal thus indicating that proper positioning had been achieved. In a similar manner if the heads are moved so as to place head H2 close to the channel 104 whereas the head H3 was placed far away, that is to the extreme right of the channel, a larger amplitude positive signal would be introduced to the input of the amplifier 156. This signal will then cause the null seeking servo to turn in an opposite direction thus returning the head H2 to its proper relative position and bring the heads H1 and H3 back to their desired position. The operation of the servo again being stopped upon the receipt of a zero error signal at the input of the amplifier 156.

Figure 2:
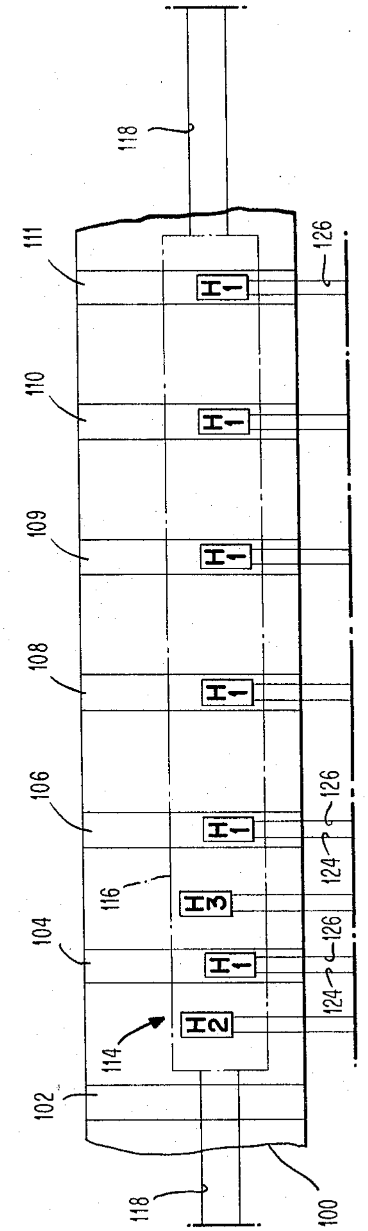
FIGURE 2 illustrates a further embodiment of the invention disclosed herein.

If it were desired to position a plurality of read-write heads H1, for example, in the case where the data was placed in a parallel fashion or where all the required data for a given operation were located in a limited area, this could be easily done merely by making a small modification of device shown in the FIGURE 1, as shown in FIGURE 2. The support member 116 is enlarged to accommodate a number of heads H1, equal to the number desired to be used. In the extreme case there would be provided one head H1 for each of the possible tracks, 102, 104, 106, 108, 109, 110 and 111. However, certain savings in equipment can be achieved by using one head H1 to cooperate with a number of adjacent tracks in track groups on preset areas of the drum surface. The head H1 would then be positioned over the desired track within the track group as the support number 116 is moved. At one end of the support member 116, the heads H2 and H3 would be placed so as to ride to the left and right, respectively, of a single track used as a guide or homing track. The guide or homing track may have recorded therein a special guide or homing pattern or it may serve the dual function of a guide or homing track and information track as described with reference to FIGURE 1 above. Further, where there is provided a single head H1 to cooperate with a number of information tracks in a track group, there will be provided a number of parallel guide or homing tracks, corresponding in number to the number of information tracks in the track group. A different guide or homing track will be used to position the head H1 over each of the different information tracks in the group. The heads H2 and H3 will always read the respective edges of the guide or homing track as described above. The positioning of the assembly would be achieved as set forth above. Selection of an individual head could then be made merely by providing a selection device to select among the heads which are aligned by the device as shown in FIGURE 2. In the arrangement where one head H1 is used with a plurality of tracks in a track group, selection of a single track is made as a result of the physical movement of the head H1 to the proper track.

Further, although one grouping of three heads has been shown in FIGURE 1 the principles set forth in the invention are fully applicable to a plurality of groups of heads distributed along the length of the drum which might be used to read particular tracks or particular areas of the information stored on the surface of the drum.

It will be understood that various omissions and substitutions and changes of the form and detail of the device illustrated and in its operation may be made by those skilled in the art, without departing from the spirit of the invention.

The embodiments of the invention in which an exclusive property or privilege is claimed are defined as follows:

1. A device for properly aligning a sensing head with a magnetic recording track comprising:

(a) a first sensing head for reading signals recorded upon said magnetic recording track;

(b) a second sensing head for sensing the effect of signals recorded in said magnetic recording track adjacent one edge of said track;

(c) a third sensing head for sensing the effect of signals recorded in said magnetic recording track adjacent the other edge of said track;

(d) mounting means arranged to hold said first, second and third sensing means in desired positions relative to one another and adapted for movement relative to said magnetic recording track;

(e) first positioning means responsive to a first signal to move said mounting means to a position of approximate alignment with said magnetic recording track;

(f) said first positioning means including:

(1) an input terminal for receiving said first signal indicative of said approximate position;

(2) a demodulator and power amplifier means connected to said terminal and adapted to provide a signal of a correct polarity and amplitude;

(3) a null seeking servo connected to said demodulator and power amplifier and arranged to take up a position in accordance with the signal supplied by said demodulator and power amplifier means;

(4) a feedback potentiometer means connected to a reference voltage source and adapted to provide a signal to said terminal indicative of any error in position between where the servo should be and where the servo actually is;

(5) means connected to said servo and arranged to be rotated as said servo turns to sweep said feedback potentiometer and further to move said mounting means;

(6) and means to disconnect said first positioning device when said first signal is reduced;

(g) and second positioning means responsive to said second and said third sensing heads to move said mounting means to a position of correct alignment with said magnetic recording track.

2. A device as in claim 1 wherein said second positioning device comprises:

(a) a first means to receive the signals read by said second sensing head and produce a third signal of a first polarity and of a magnitude indicative of the relative closeness of said second sensing head to said magnetic recording track;

(b) a second means to receive the signals read by said third sensing head and provide a fourth signal of a a second polarity and of a magnitude indicative of the relative closeness of said third sensing head to said magnetic recording track;

(c) third means connected to said first and second means to produce a signal representative of the algebraic difference between said third and fourth signals;

(d) and means to connect said second positioning device to said servo when said first positioning device has been disconnected.

References Cited by the Examiner

UNITED STATES PATENTS

| | | | |
|---|---|---|---|
| 2,679,620 | 5/1954 | Berry | 318—20.150 |
| 3,007,144 | 10/1961 | Hagopian | 340—174.1 |
| 3,017,496 | 1/1962 | Greene | 318—20.150 |
| 3,023,404 | 2/1962 | Dickerson | 340—174.1 |
| 3,034,111 | 5/1962 | Hoagland et al. | 340—174.1 |
| 3,126,535 | 3/1964 | Streeter | 340—174.1 |

OTHER REFERENCES

IBM Technical Disclosure Bulletin (G.N. Tsilibes), volume 4, No. 5, October 1961, pp. 24, 25.

TERRELL W. FEARS, *Acting Primary Examiner.*

IRVING SRAGOW, *Examiner.*

A. F. BERNARD, F. C. WEISS, *Assistant Examiners.*